United States Patent

[11] 3,629,542

| [72] | Inventor | Allan S. Warner<br>6 Tudor Court, Elizabeth, N.J. 07208 |
|---|---|---|
| [21] | Appl. No. | 40,060 |
| [22] | Filed | May 25, 1970 |
| [45] | Patented | Dec. 21, 1971 |

[54] MANUFACTURE OF WIRE TERMINALS
9 Claims, 9 Drawing Figs.

[52] U.S. Cl. .................................................. 219/79,
219/103
[51] Int. Cl. .................................................. B23k 9/12
[50] Field of Search .......................................... 219/79, 80,
103, 107; 29/203 DT

[56] References Cited
UNITED STATES PATENTS

| 3,037,108 | 5/1962 | Poillevey | 219/107 X |
| 2,798,935 | 7/1957 | Kipp | 219/79 |
| 2,915,616 | 12/1959 | Griffin | 219/79 |
| 3,003,051 | 10/1961 | Kulicke et al. | 219/79 X |
| 3,441,707 | 4/1969 | Warner | 219/79 X |

Primary Examiner—J. V. Truhe
Assistant Examiner—Hugh D. Jaeger
Attorney—Harry B. Rook ABSTRACT: A strip of metal is fed longitudinally in steps at the end of each of which the leading end portion of the strip lies across the space between two spaced opposed electrodes adapted to be connected in an electric fusing or welding circuit and in one of which is a fixed cutting blade. A complemental blade and forming finger are moved together relatively to and cooperate with said fixed cutting blade and said electrodes respectively to sever the leading end portion of the strip and to press it into a channel-shaped clip between said electrodes and a stop plate. Wires are inserted into the clip and the clip and wires are squeezed between the electrodes to tightly compress the wires in the clip and to press together the edge portions of the sidewalls of the clip. Then the fusing circuit is energized to fuse together the contacting portions of the clip and wires, after which the circuit is deenergized the wires are cut, the electrodes are separated, and the clip with the wires fused therein is ejected.

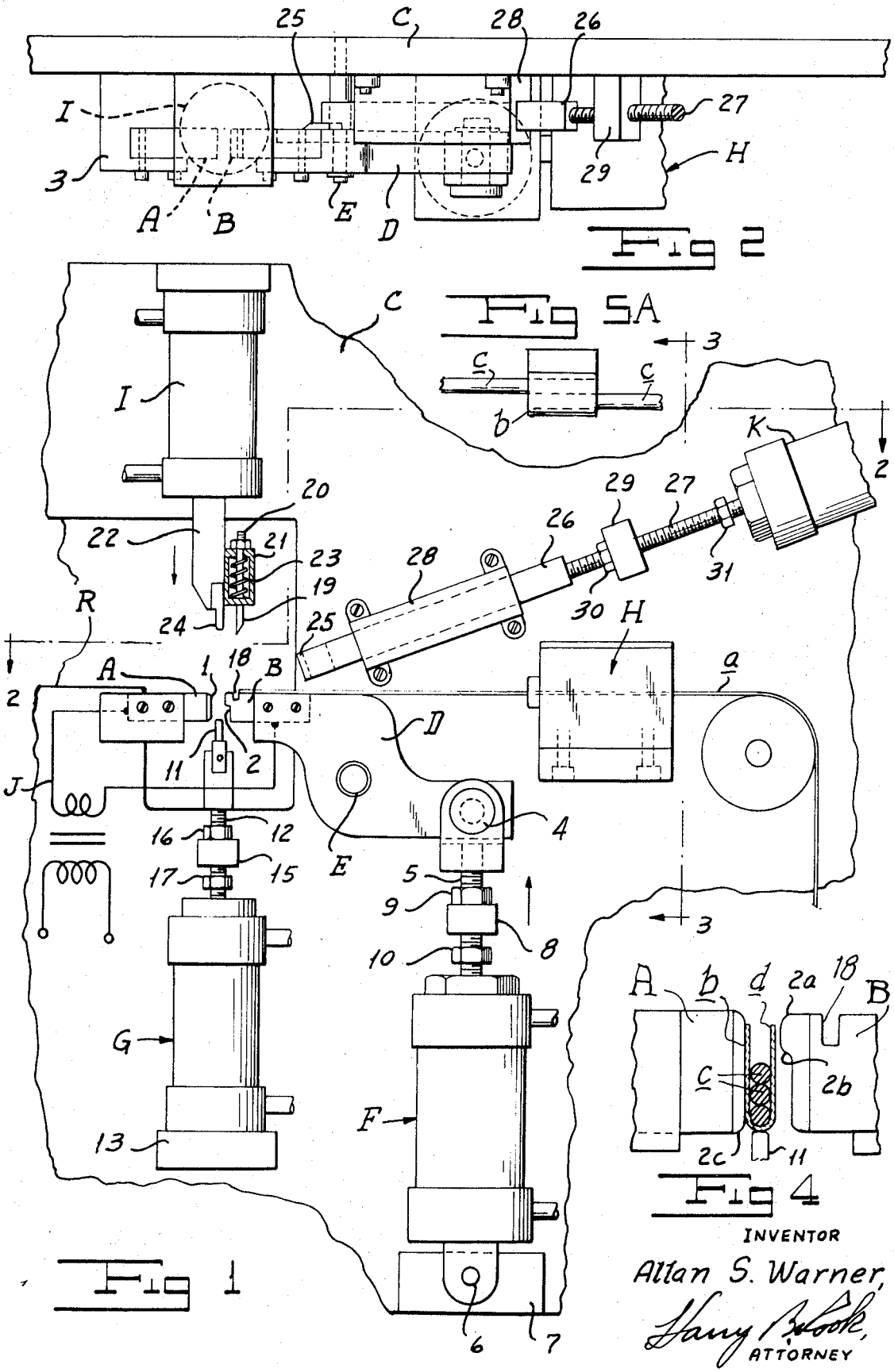

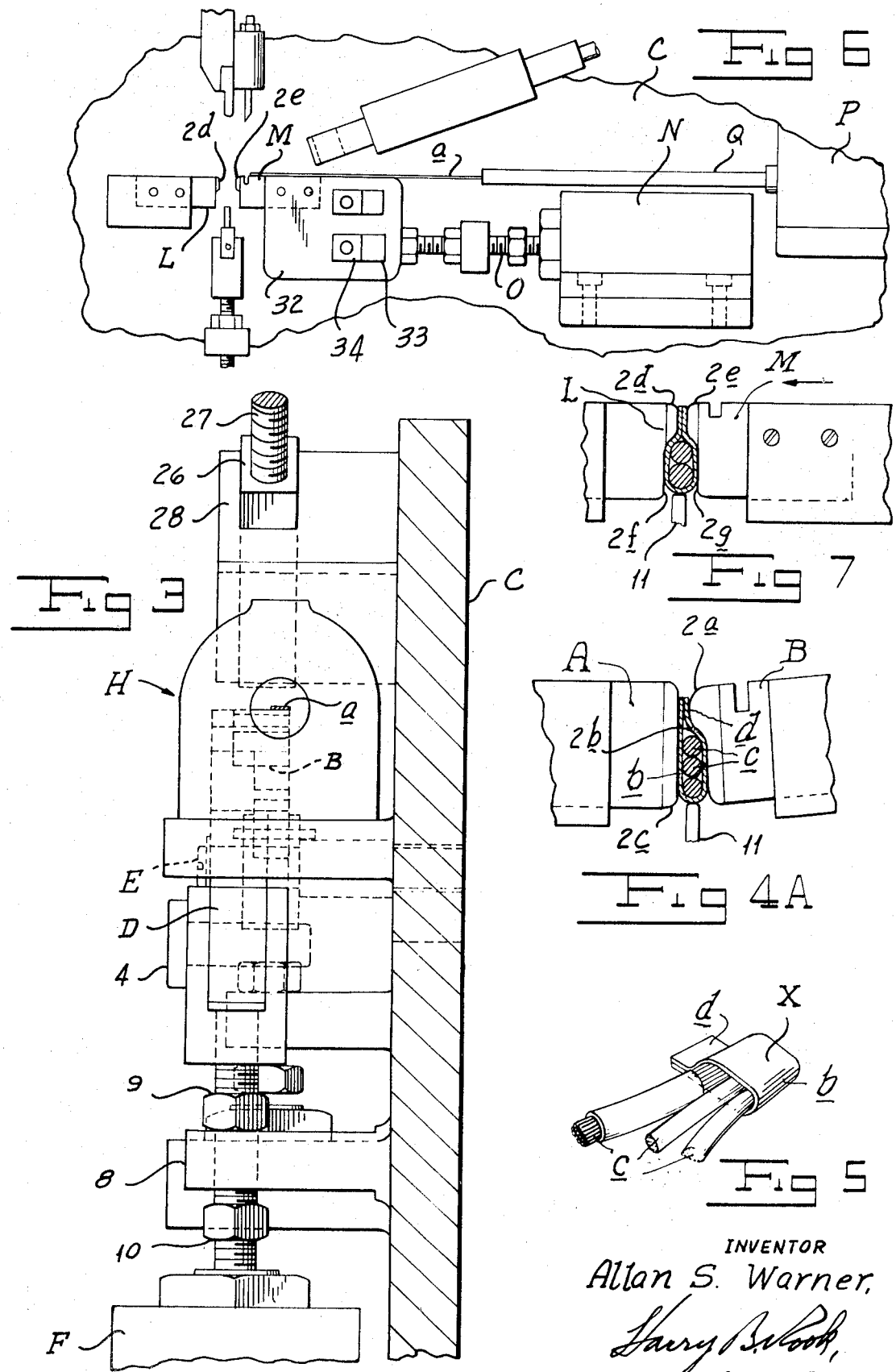

MANUFACTURE OF WIRE TERMINALS

BACKGROUND OF THE INVENTION

1. Field of the Invention

The invention relates to the formation of a terminal clip and the fusing together of the clip and wires.

2. The Prior Art

The forming of a channel-shaped clip between two relatively movable shaping members and compressing the clip around the wires, is known, as is also the fusing or welding of wires in such a clip to complete a terminal. As shown, for example, by U.S. Pat. No. 3,441,707, a channel-shaped clip is formed in a combined die and electrode, the flanges of the clip are pressed over the wires by a plurality of forming fingers, and thereafter a second electrode is required to weld the assembly.

It is desirable to utilize fewer parts and to perform the operation more rapidly.

SUMMARY

A primary object of the present invention is to provide a simple method and an apparatus comprising a minimum number of parts for forming a flat strip of metal into a channel-shaped clip between two spaced opposed electrodes adapted to be connected in a fusing or welding circuit and which are relatively movable to squeeze and hold between them said clip and one or more wires inserted into the clip and energizing said circuit while the wires and clip are so held to fuse the clip and wires together and to fuse together the edge portions of the sidewalls of the clip.

The opposed faces of the electrodes may be contoured to shape the clip as desired.

The invention also contemplates pivotal movement of at least one of the electrodes to squeeze the wires against each other and into the bight of the clip and simultaneously press the edge portions of the clip sidewalls into contact with each other.

BRIEF DESCRIPTION OF THE DRAWINGS

For a more complete understanding of the invention, reference should be had to the following description in conjunction with the accompanying drawings in which:

FIG. 1 is a schematic front elevational view of apparatus embodying the invention, with portions broken away;

FIG. 2 is a top plan view approximately from the plane of the line 2—2 of FIG. 1, with portions omitted:

FIG. 3 is an enlarged side elevation taken approximately from the plane of the line 3—3 of FIG. 1;

FIG. 4 is an enlarged fragmentary front elevation of the two electrodes with a clip and wires disposed between the electrodes and prior to the fusing operation;

FIG. 4A is a similar view showing the position of the electrodes, clip and wires during the fusing operation:

FIGS. 5 and 5A are perspective views respectively of two different forms of the completed assembly of the clip and wires constituting a terminal;

FIG. 6 is a fragmentary front elevational view of a modification of the apparatus for producing another form of terminal and;

FIG. 7 is an enlarged fragmentary front elevation of the electrodes shown in FIG. 6 with a clip and wires between the electrodes during the fusing operation.

DESCRIPTION OF THE PREFERRED EMBODIMENTS

Referring particularly to FIGS. 1 through 4A, the apparatus includes two relatively movable electrodes A and B mounted on a vertical support frame plate C with their faces 1 and 2 normally in spaced opposed relationship and with their tops sides in a common plane. Electrode A is fixed on a bracket 3 and electrode B is mounted on one end of a lever D which is pivotally mounted between its ends on a pivot stud E secured in the frame plate C. The other end of the lever D is pivotally connected at 4 to the piston rod 5 of a fluid pressure motor F one end of whose cylinder is pivotally mounted at 6 on a bracket 7 secured to the frame plate. The piston rod 5 is slidable through a stop lug 8 on the frame plate with which coacts adjustable stop nuts 9 and 10 on the piston rod to limit movements of the rod.

The faces of the electrode form in effect the sidewalls of a die the bottom wall of which is formed by the edge of a plate 11 which is mounted on the end of the piston rod 12 of a fluid pressure motor G that is supported on a bracket 13 on the frame plate. The piston rod is vertically slidable through a stop lug 13 similar to the lug 8 which coacts with the stop nuts 16 and 17 to limit movements of the rod.

Normally the electrodes and the plate 11 are in the positions shown in FIG. 1 and a stock strip of metal $a$ is fed longitudinally step-by-step from a supply roll (not shown) by feeding mechanism H which may be of any suitable construction, for example, that shown in the Warner U.S. Pat. No. 3,441,707, so that at the end of each step the end portion of the strip lies on the top surfaces of the electrodes and across the space between the electrodes.

The pivotal electrode B has a groove 18 in its top surface one edge of which constitutes a cutting blade with which coacts a movable cutting blade 19 mounted on a pin 20 which is slidably mounted in a casing 21 secured on the piston rod 22 of a fluid pressure motor I whose cylinder is rigidly mounted on the frame plate C above the electrodes. A spring 23 normally urges downward movement of the pin 20 and blade 19 which is limited by a stop nut 23$a$. Also mounted on the piston rod 22 adjacent said blade is a crimping or forming plate 24 normally disposed above and in alignment with the space between the electrode faces.

When a clip is to be formed the stock strip lies across the space between the electrode faces and the motor I is energized to force piston rod 22 with the blade 19 and the crimping plate 24 downwardly to cause the blade 19 to coact at the edge of the groove 18 to sever the stock strip and upon further movement of the piston rod to cause the crimping plate to push and bend the severed portion of the strip downwardly between the electrode faces against the bottom plate 11 to form clip $b$ having spaced apart approximately parallel sidewalls connected by a bight as shown in FIG. 4. The crimping plate and cutter are then retracted. One or more wires $c$ are then inserted into the clip $b$ either by hand or by some mechanical means and the crimping plate 24 is again actuated downwardly to squeeze the wires into the clip (FIG. 4). Motor F is then energized to swing the lever D on its pivot 3 and force the face 2 of the electrode B into contact with the clip so as to squeeze the wires into the clip and press the edge portion of one sidewall $d$ of the clip against the edge of the other sidewall (FIG. 4A). Preferably the face of the electrode B is contoured to provide a lug 2$a$ which merges through a curved surface 2$b$ into a flat surface 2$c$ so that as the lever D is swung to move the electrode B toward electrode A, the lug 2$a$ will press the edge portions of the sidewall of the clip into contact with the edge portion of the other sidewall, and the beveled surface 2$b$ and flat surface 2$c$ will squeeze the wires tightly into the bight or bend of the clip and into contact with each other as best shown in FIG. 4A.

While the clip and wires are so squeezed between the electrodes, fusing or welding current is passed through the electrodes, clip and wires. The electrodes are connected in series in a welding or fusing circuit generally designated J in FIG. 1. Any suitable electric circuit may be utilized within the skill of the art. The edge portions of the sidewalls of the clip are thus fused together and the wires are fused together and to the clip.

After the fusing operation and while the clip is still squeezed between the electrodes, the wires are severed by coaction of cutting blade 25 with the rear edge of the electrode A. Blade 25 is shown as mounted on a slide bar 26 slidable in a guide 28 secured to the frame plate C; and the slide bar 26 is connected to the piston rod 28 of a fluid pressure motor K mounted on the frame plate. The piston rod is slidable through a stop lug 20 with which coacts stop nuts 30 and 31 to limit movement of the piston rod.

The electrode B is then retracted to its normal position and the completed assembly is ejected by movement of the bottom plate 11 upwardly upon energization of the motor G. After the ejection, the motor G retracts the plate 11 to its normal position to limit the movement of next clip into the space between the electrode faces.

Manifestly the fluid pressure motors will be operated by any suitable means in timed relation to each other to effect the movements herein described. Also the welding circuit will be energized and deenergized by any suitable known means in timed relation to the movement of the electrodes. The completed terminal formed by the apparatus of FIGS. 1, 2 and 3 is shown in FIG. 5 and generally designated X.

FIGS. 6 and 7 show a modification of the apparatus for producing a different form of the terminal. Both the fixed electrode L and the movable electrode M have lugs similar to the lug 2a for a simultaneously bending the edge portions of the sidewalls of the clip into contact with each other so that said edge portions lie approximately in a plane that passes centrally between and parallel to the sidewalls of the clip, as shown in FIG. 7 instead of in the plane of one sidewall as shown in FIG. 4A. The lugs are designated 2d and 2e respectively and they merge through inclined or curved surfaces into approximately flat surfaces 2f and 2g. At least one of the electrodes, in the present instance the electrode M is horizontally movable, being shown as mounted on a slide block 32 which has slots 33 in which are guide blocks 34 which are secured to the frame plate C. The electrode M is actuated toward and from electrode L by a fluid pressure motor N whose piston O is connected to the slide block 32. Desirably the stock strip a is guided from the linear strip feeding mechanism P by a guide tube 35 which prevents buckling of the strip during the feeding thereof into position across the space between the electrode forces.

In some cases, it is desirable to mount both electrodes for movement, either horizontally or pivotally. Also, the faces may be contoured to make clips of different shapes and sizes.

In both forms of the apparatus it is desirable to provide means of access to the electrodes from both sides thereof, and for simplicity of illustration, an opening R is provided in the frame plate as most clearly seen in FIG. 1. This opening is necessary when it is required that the wires extend from both sides of the clip in an "opposed connection" as shown in FIG. 5A instead of extending from the same side of the clip in a "parallel connection" as shown in FIG. 5.

It is desirable that the motor K be turned off or deenergized when the cutter is not needed for example, during the making of the clip in FIG. 5A.

I claim:

1. Apparatus for making a wire terminal comprising a frame, two electrodes on said frame each with an approximately vertical end face normally in spaced opposed relation to an end face of the other electrode and each with a top face normally in horizontal alignment with the top face of the other electrode, means for feeding a strip of metal longitudinally step-by-step along said top faces to locate the leading end portion of said strip across the space between said end faces of the electrodes;

means for severing said leading end portion and simultaneously crimping the severed end portion into the space between said electrode faces to form a channel-shaped clip having spaced-apart approximately parallel sidewalls connected by a bight into which bight of the clip at least one wire is inserted and disposed inwardly of the edges of the end portions of said sidewalls, and means movably mounting at least one of said electrodes for movement of its end face relatively to the end face of the other electrode to squeeze said sidewalls of the clip between said end faces toward each other and into tight contact with said wire, said end faces of the electrodes being contoured to press said sidewalls into contact with said wire and at the same time to press said end portions of said sidewalls of the clip outwardly of said wires into contact with each other.

2. Apparatus as defined in claim 1 with the addition of means including said electrodes in a welding circuit operative in timed relation to movement of said movable electrode and while the clip and wire are so squeezed to fuse said sidewalls to said wires and at the same time to fuse said end portions of said sidewalls to each other.

3. Apparatus as defined in claim 1, wherein at least one electrode is mounted for linear horizontal movement to move its end face toward and away from the end face of the other electrode.

4. Apparatus as defined in claim 1, wherein at least one electrode is mounted for pivotal movement to tilt its end face relatively to the end face of the other electrode.

5. Apparatus as defined in claim 1, wherein the end face of each electrode has a flat surface in spaced opposed relation to the flat surface of the other electrode providing between said faces a space for said clip with said wires therein, and at least one of said faces has a lug projecting therefrom to press the end portion of one sidewall of the clip into contact with the end portion of the other sidewall.

6. Apparatus as defined in claim 5, wherein each end face has a flat surface and a lug for the purpose described.

7. Apparatus as defined in claim 1, with the addition of a plate normally disposed in alignment with the space between said end faces of the electrode providing a stop for said clip as the clip is crimped.

8. Apparatus as defined in claim 7 with the addition of means operated in timed relation to the movement of said movable electrode to actuate said plate into and out of said space to eject the completed clip and wire assembly and to provide a stop for a clip being crimped, respectively.

9. Apparatus as defined in claim 1 with the addition of a cutting blade reciprocably mounted on said frame and coactive with a cutting edge on said one of said electrodes to cut said wires after they have been fused in the clip and while the clip and wire assembly is squeezed between said electrode faces.

* * * * *